United States Patent
Shvartsman

(10) Patent No.: US 12,423,142 B2
(45) Date of Patent: Sep. 23, 2025

(54) METHODS AND SYSTEMS FOR ACCESSING A RESOURCE

(71) Applicant: Michael Shvartsman, Hollywood, FL (US)

(72) Inventor: Michael Shvartsman, Hollywood, FL (US)

( * ) Notice: Subject to any disclaimer, the term of this patent is extended or adjusted under 35 U.S.C. 154(b) by 0 days.

(21) Appl. No.: 17/758,433

(22) PCT Filed: Jan. 11, 2021

(86) PCT No.: PCT/US2021/012986
§ 371 (c)(1),
(2) Date: Jul. 6, 2022

(87) PCT Pub. No.: WO2021/146149
PCT Pub. Date: Jul. 22, 2021

(65) Prior Publication Data
US 2023/0021356 A1    Jan. 26, 2023

Related U.S. Application Data

(60) Provisional application No. 62/960,222, filed on Jan. 13, 2020.

(51) Int. Cl.
  *G06F 15/16* (2006.01)
  *G06F 9/50* (2006.01)
  *G06F 21/31* (2013.01)

(52) U.S. Cl.
  CPC ............ *G06F 9/5011* (2013.01); *G06F 21/31* (2013.01)

(58) Field of Classification Search
  CPC .............................. G06F 9/5011; G06F 21/31
  See application file for complete search history.

(56) References Cited

U.S. PATENT DOCUMENTS

| | | | |
|---|---|---|---|
| 9,584,515 B2 * | 2/2017 | Hayton | .................. H04L 63/10 |
| 2002/0118813 A1 | 8/2002 | Brehm et al. | |

(Continued)

OTHER PUBLICATIONS

International Search Report in International App. No. PCT/US2021/012986 dated Apr. 1, 2021 in 2 pages.

(Continued)

*Primary Examiner* — Normin Abedin
(74) *Attorney, Agent, or Firm* — Knobbe, Martens, Olson & Bear, LLP

(57) ABSTRACT

There is provided a method including receiving, at a resource access gateway (RAG), an electronic request for a given quantity of a resource, and a first credential for accessing a first source of the resource. The first credential may have been input at an input interface in association with the electronic request. The method also includes obtaining a second credential from a credential storing computer-readable storage medium (CRSM) based on the first credential. The second credential may be for accessing a second source of the resource. In addition, the method includes generating at the RAG an electronic authorization for the given quantity to be collected from the second source using the second credential, and sending the electronic authorization to a transfer gateway, which may collect the given quantity from, the second, source, in addition, the method may include outputting a confirmation of access to the given quantity of the resource.

21 Claims, 4 Drawing Sheets

(56) References Cited

U.S. PATENT DOCUMENTS

| | | |
|---|---|---|
| 2004/0172346 A1 | 9/2004 | Kanekar et al. |
| 2007/0054654 A1* | 3/2007 | Jones .................. H04L 12/1403 455/406 |
| 2010/0085978 A1 | 4/2010 | Ramankutty et al. |
| 2011/0055900 A1* | 3/2011 | Chua .................... H04L 63/104 726/4 |

OTHER PUBLICATIONS

International Preliminary Report on Patentability mailed Jul. 28, 2022 in International Application PCT/US2021/012986.
Radonić, M., "Payment Processing in Web Based Environments: The Benchmark of the Wordld's Leading Payment Processing," Jun. 12, 2018, retrieved from internet: URL:https://www.researchgate.net/profile/Milenko-Radonic-2/publication/346107846_Payment_processing_in_web-based_environments_-_Benchmark_of_the_World's_Leading_Payment_Processors/links/5ff6e0d245851553a026e324/Payment-processing-in-web-based-environments-Bench mark-of-the-Worlds-Leading-Payment- Processo [retrieved on Oct. 3, 2023].
Extended European Search Report Received in European Application No. 2141105.7 dated Oct. 10, 2023.
Office Action received in Canadian Application No. 3,162,530 dated Feb. 8, 2024.
Office Action received in European Application No. 21741105.7 dated Jun. 25, 2024.
Office Action in Canadian Application No. 3,162,530 dated Oct. 21, 2024 in 4 pages.

\* cited by examiner

METHODS AND SYSTEMS FOR ACCESSING A RESOURCE

CROSS-REFERENCE TO RELATED APPLICATION

This application claims the benefit of, and priority from, U.S. Provisional Patent Application No. 62/960,222, filed on Jan. 13, 2020, which is incorporated herein by reference in its entirety.

The present specification relates to methods and systems for accessing a resource, and in particular to methods and systems for securely accessing a resource.

BACKGROUND

In order to accomplish certain tasks or complete certain functions, a quantity of a resource may be needed. Such a resource may be available from a source that may provide electronic or digital access to the resource. The source may be accessed remotely to obtain the quantity of the resource to accomplish tasks or perform functions that use the resource.

SUMMARY

According to an implementation of the present specification there is provided a method for securely accessing a resource, the method comprising: receiving at a resource access gateway (RAG) an electronic request for a given quantity of the resource; receiving at the RAG a first credential for accessing a first source of the resource, the first credential input at an input interface in association with the electronic request; obtaining at the RAG a second credential from a credential storing computer-readable storage medium (CRSM) based on the first credential, the second credential for accessing a second source of the resource; generating at the RAG an electronic authorization for the given quantity to be collected from the second source using the second credential; sending the electronic authorization from the RAG to a transfer gateway, the transfer gateway to collect the given quantity from the second source based on the electronic authorization; and outputting a confirmation of access to the given quantity of the resource.

The method may further comprise: before the sending the electronic authorization, generating at the RAG a backup electronic authorization for the given quantity to be accessed from the first source using the first credential; and after the outputting the confirmation of access, releasing the backup electronic authorization.

The method may further comprise: if the transfer gateway fails to collect the given quantity from the second source based on the electronic authorization: generating at the RAG a further electronic authorization for the given quantity to be collected from the first source using the first credential; and sending the further electronic authorization from the RAG to a further transfer gateway, the further transfer gateway to collect the given quantity from the first source based on the further electronic authorization.

The method may further comprise: after the receiving at the RAG the first credential, receiving at the RAG the second credential; and storing in the credential storing CRSM the second credential in association with the first credential.

The sending the electronic authorization from the RAG to the transfer gateway may comprise sending the electronic authorization from the RAG to the transfer gateway to direct the transfer gateway to collect the given quantity from the second source and transfer the given quantity into a repository associated with the RAG.

The receiving at the RAG the electronic request for the given quantity of the resource may comprise receiving at the RAG the electronic request from a requester for the given quantity of the resource; and the sending the electronic authorization from the RAG to the transfer gateway may comprise sending the electronic authorization from the RAG to the transfer gateway to direct the transfer gateway to collect the given quantity from the second source and transfer the given quantity into a repository associated with the requester.

The method may further comprise: before the generating the electronic authorization, obtaining at the RAG a second source status indicator to indicate whether the second source contains the given quantity of the resource; and the generating the electronic authorization may comprise generating at the RAG the electronic authorization based on the second source status indicator According to another implementation of the present specification there is provided a resource access gateway (RAG) for securely accessing a resource, the RAG comprising: a memory to store a first credential for accessing a first source of the resource in association with a second credential for accessing a second source of the resource; a processor in communication with the memory, the processor to: receive an electronic request for a given quantity of the resource; receive the first credential input at an input interface in association with the electronic request; obtain the second credential from the memory based on the first credential; generate an electronic authorization for the given quantity to be collected from the second source using the second credential; send the electronic authorization to a transfer gateway, the transfer gateway to collect the given quantity from the second source based on the electronic authorization; and output a confirmation of access to the given quantity of the resource.

The processor may be further to: before sending the electronic authorization, generate a backup electronic authorization for the given quantity to be accessed from the first source using the first credential; and after outputting the confirmation of access, release the backup electronic authorization.

The processor may be further to: if the transfer gateway fails to collect the given quantity from the second source based on the electronic authorization: generate a further electronic authorization for the given quantity to be collected from the first source using the first credential; and send the further electronic authorization to a further transfer gateway, the further transfer gateway to collect the given quantity from the first source based on the further electronic authorization.

The processor may be further to: after receiving the first credential, receive the second credential; and store in the memory the second credential m association with the first credential.

To send the electronic authorization to the transfer gateway the processor may be to send the electronic authorization to the transfer gateway to direct the transfer gateway to collect the given quantity from the second source and transfer the given quantity into a repository associated with the RAG.

To receive the electronic request for the given quantity of the resource the processor may be to receive the electronic request from a requester for the given quantity of the resource; and to send the electronic authorization to the transfer gateway the processor may be to send the electronic authorization to the transfer gateway to direct the transfer gateway to collect the given quantity from the second source and transfer the given quantity into a repository associated with the requester.

The processor may be further to: before generating the electronic authorization, obtain a second source status indicator to indicate whether the second source contains the given quantity of the resource; and to generate the electronic authorization, the processor may be to generate the electronic authorization based on the second source status indicator.

According to another implementation of the present specification there is provided a non-transitory computer-readable storage medium comprising instructions for securely accessing a resource executable by a processor, the instructions to cause the processor to: receive an electronic request for a given quantity of the resource; receive a tint credential for accessing a first source of the resource, the first credential input at an input interface in association with the electronic request; obtain a second credential from a credential storing computer-readable storage medium (CRSM) based on the first credential, the second credential for accessing a second source of the resource; generate an electronic authorization for the given quantity to be collected from the second source using the second credential; send the electronic authorization to a transfer gateway, the transfer gateway to collect the given quantity from the second source based on the electronic authorization; and output a confirmation of access to the given quantity of the resource.

The instructions may be to further cause the processor to: before sending the electronic authorization, generate a backup electronic authorization for the given quantity to be accessed from the first source using the first credential; and after outputting the confirmation of access, release the backup electronic authorization.

The instructions may be to further cause processor to: if the transfer gateway fails to collect the given quantity from the second source based on the electronic authorization: generate a further electronic authorization for the given quantity to be collected from the first source using the first credential; and send the further electronic authorization to a further transfer gateway, the further transfer gateway to collect the given quantity from the first source based on the further electronic authorization.

The instructions may be to further cause processor to: after receiving the first credential, receive the second credential; and store in the credential storing CRSM the second credential in association with the first credential.

To cause the processor to send the electronic authorization to the transfer gateway the instructions may be to cause the processor to send the electronic authorization to the transfer gateway to direct the transfer gateway to collect the given quantity from the second source and transfer the given quantity into a repository associated with a resource access gateway (RAG), the processor associated with the RAG.

To cause the processor to receive the electronic request for the given quantity of the resource the instructions may be to cause the processor to receive the electronic request from requester for the given quantity of the resource; and to cause the processor to send the electronic authorization to the transfer gateway the instructions may be to cause the processor to send the electronic authorization to the transfer gateway to direct the transfer gateway to collect the given quantity from the second source and transfer the given quantity into a repository associated with the requester.

The instructions may be to further cause processor to: before generating the electronic authorization, obtain a second source status indicator to indicate whether the second source contains the given quantity of the resource; and to cause the processor to generate the electronic authorization the instructions may be to cause the processor to generate the electronic authorization based on the second source status indicator.

BRIEF DESCRIPTION OF THE DRAWINGS

In the drawings, identical reference numbers identify similar elements or acts. The sizes and relative positions of elements in the drawings, are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, and the like.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

For some resources, access to the resource may be restricted or controlled using credentials. In some examples, the resource may comprise data stored in a data repository or data center. The data repository or data center may also be described as a source of the data, or a source from which the data may be obtained. Some examples of credentials may comprise a password, decryption key, or other tokens or data packets used to authorize or gain access to the data stored in the data center.

Accessing the resource remotely may include communicating the credentials over a communication network to authorize accessing the resource from its source. To access the resource frequently, the credentials may be communicated frequently over communication networks. Such frequent communications may render the credentials vulnerable to interception and potential misuse.

In addition, relying on a single source for obtaining the resource may be vulnerable to corruptions or failures of that source. For example, if only one copy or one repository of data is maintained, failures or corruptions of that single copy or repository may compromise the ability to access the data.

In some examples, multiple sources of the resource may be used to provide redundancy, and to reduce the likelihood of access to the resource being compromised as a result of one of the sources failing or becoming corrupted. In the example of storing data, multiple copies of the data may each be stored in a corresponding repository or data center, to provide redundancy and increase the reliability of access to the data. Each source may have its own access credentials. Communicating this plurality of credentials each time remote access to the resource is needed may use large amounts of communication bandwidth and power, and may also expose all of the credentials to the repeated risk of interception in transit.

Figure 1:
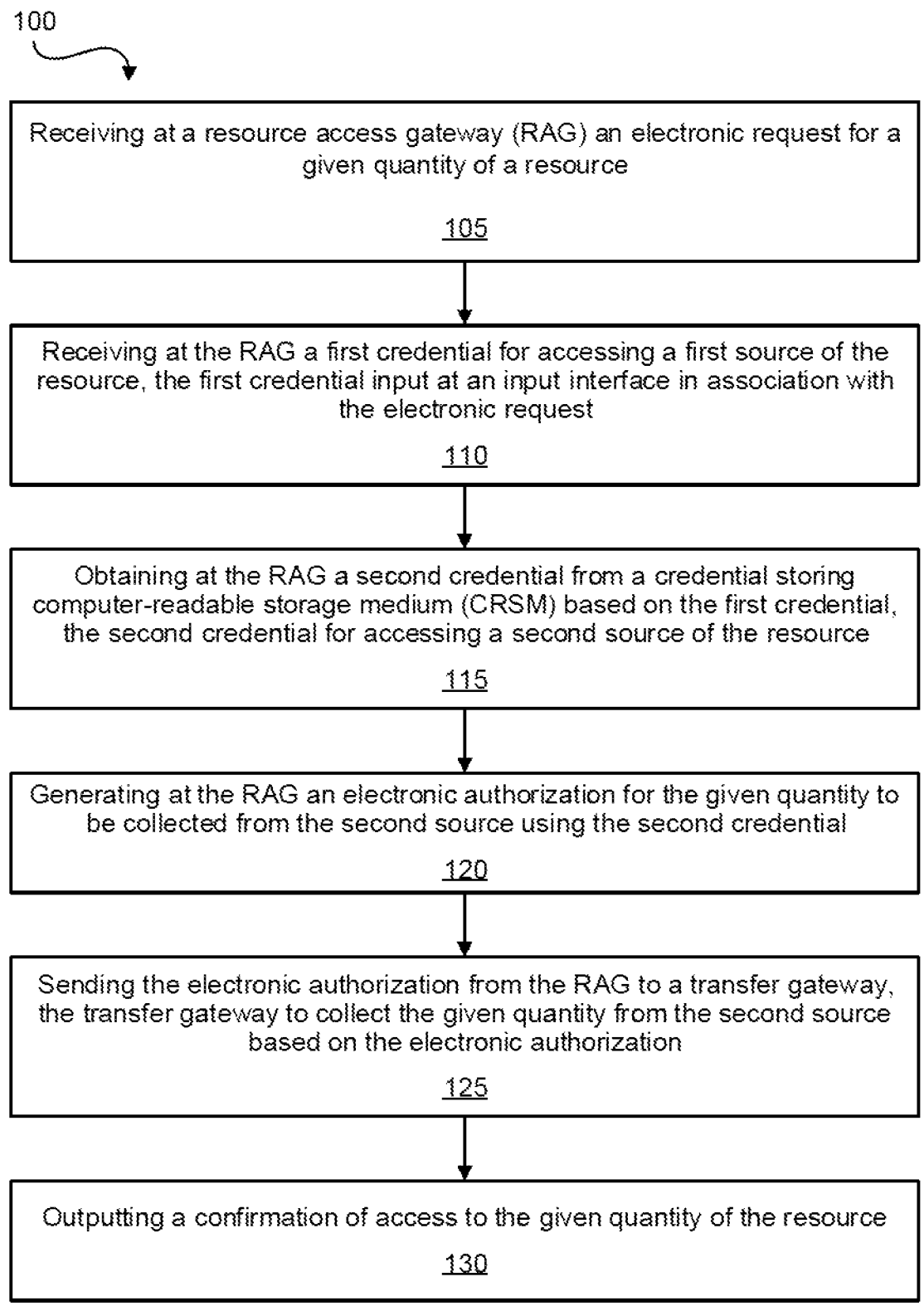
FIG. 1 shows a flowchart of an example method for securely accessing a resource, in accordance with a non-limiting implementation of the present specification.

FIG. 1 shows a flowchart of an example method 100, which may be for securely accessing a resource. Method 100 and the other methods and systems described herein may address some or all of the technical challenges described above. At box 105 an electronic request for a given quantity of the resource may be received at a resource access gateway (RAG). An electronic request may comprise digital data, a digital data structure, a digital data packet, an electrical analogue or digital signal, an in-wire or wireless signal, and the like.

The resource may comprise a resource that may be stored or transferred electronically or digitally. The resource may be accessible remotely. In some examples, the resource may comprise data, virtual currency, digital representations of traditional or fiat currency, and the like. The quantity of the resource may comprise how much, how many, or which specific instances, types, or portions of the resource are requested.

Figure 2:
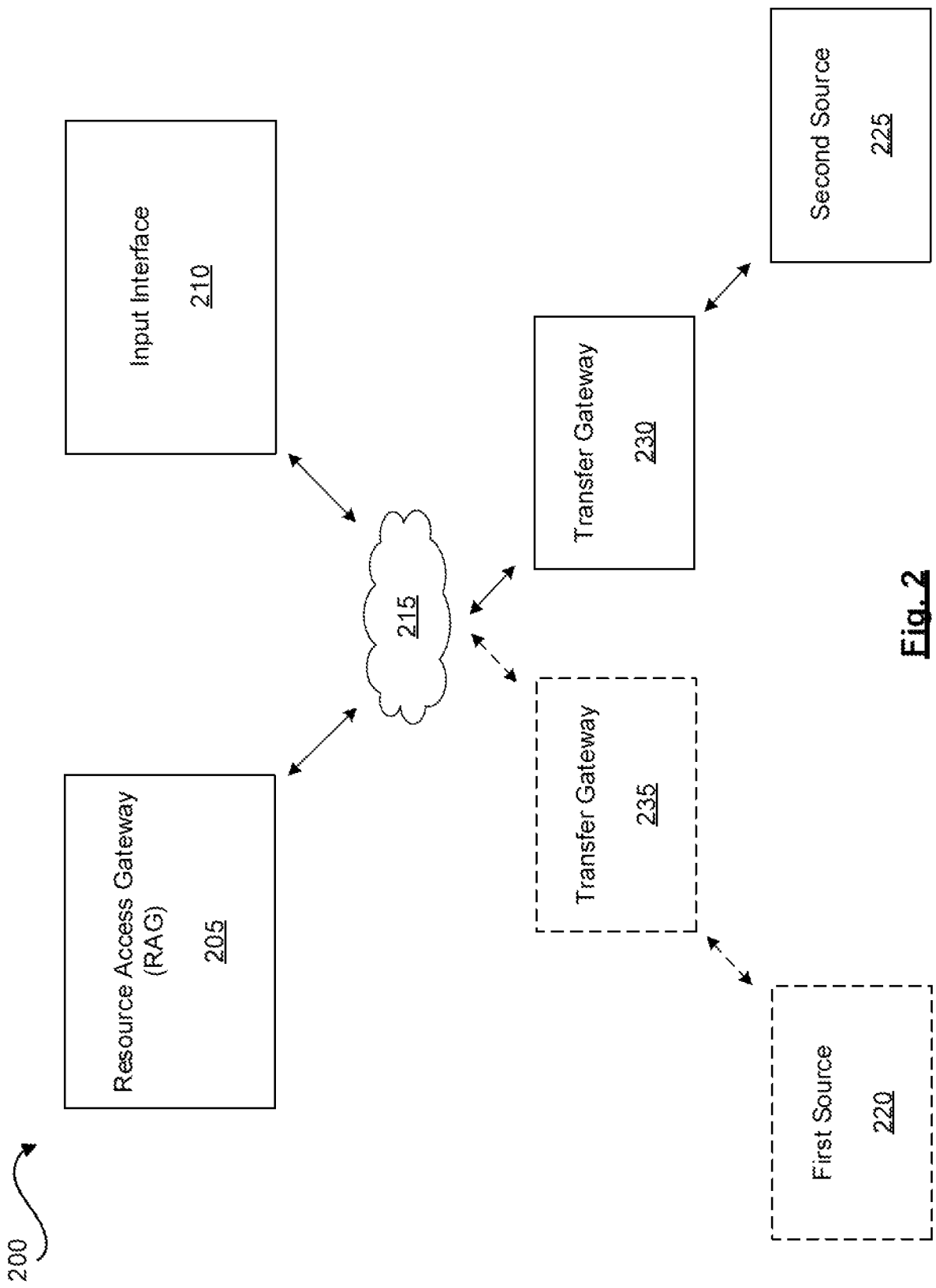
FIG. 2 shows an example system, in accordance with a non-limiting implementation of the present specification.

Moreover, the RAG may comprise a physical or a virtualized system. The RAG may comprise digital memory and a processing component or module. The RAG is described in greater detail in relation to FIG. 3. FIG. 2 shows a schematic representation of an example system 200, which may be used to implement method 100 and the other methods described herein. While method 1100 is described herein in the context of system 200, it is contemplated that in some examples method 100 and the other methods described herein may be implemented using systems other than system 200.

In some examples, RAG 205 may receive the electronic request from an input interface 210 via a network 215. In some examples, input interface 210 may comprise one or more of a touch screen, a keypad or keyboard, a microphone, a camera, a point of sale terminal, a mobile device, a wearable electronic device, a computer terminal, and the like. Moreover, in some examples, input interface 210 may also comprise a biometric reader such as a fingerprint reader, a facial recognition system, a retinal scanner, a voice recognition system, and the like. It is also contemplated that in some examples the electronic request may be received from a device or system other than input interface 210.

In some examples, network 215 may comprise a wired, wireless, or combined wired and wireless communication network. Network 215 may comprise a cellular network, a satellite network, the Internet, a local area network, a wide area network, a Wifi network, a wired or landline phone network, and the like. Furthermore, while FIG. 2 shows input interface 210 communicating with RAG 205 via network 215, it is contemplated that in some examples, interface 210 may communicate with RAG 205 directly, or via a communication network other than network 215.

At box 110, a first credential for accessing a first source 220 of the resource may be received at RAG 205. The first credential may be input at input interface 210 in association with the electronic request. The first credential may comprise a log-in, password, decryption key, biometric information, or other tokens or data packets used to gain or authorize access to the resource from first source 220. The first credential may be in the form of one or more digital tokens or digital data packets.

First credential may be associated with the electronic request. In some examples, the first credential may be input at input interface 210 in response to the electronic request. Moreover, in some examples, the electronic request and the first credential may be associated with one another using one or more identifiers, may be associated with another temporally, and the like.

At box 115, a second credential may be obtained at RAG 205, from a credential storing computer-readable storage medium (CRSM) based on the first credential. The second credential may be for accessing a second source 225 of the resource. The second credential and second source 225 may be similar in structure or function to the first credential and first source 220 respectively.

In some examples, the CRSM may comprise any electronic, magnetic, optical, or other physical storage device that stores digital data. The CRSM may include, for example, random access memory (RAM), read-only memory (ROM), electrically-erasable programmable read-only memory (EEPROM), flash memory, a storage drive, an optical disc, and the like. Moreover, in some examples, the CRSM may comprise cloud-based, distributed, or virtualized data storage.

Moreover, in some examples, RAG 205 may directly retrieve the second credential from the CRSM. In addition, in some examples, RAG 205 may receive or obtain the second credential indirectly from the CRSM. In some examples, the second credential may be stored in the CRSM in relation to the first credential or the first source. Furthermore, in some examples, both the first and second credentials may be stored in the CRSM in relation to one another or in relation to a common identifier.

At box 120, an electronic authorization may be generated at RAG 205 for the given quantity to be collected from second source 225 using the second credential. In some examples, the electronic authorization may comprise digital data, a digital data structure, a digital data packet, an electrical analogue or digital signal, an in-wire or wireless signal, and the like. The electronic authorization may provide permission or instructions for the second credential to be used to collect or obtain the given quantity of the resource from second source 225.

In some examples, generating the electronic authorization may comprise authenticating the first credential. Moreover, in some examples, authenticating the first credential may comprise confirming that the first credential input at input interface 210 in association with the electronic request is the correct credential for accessing, first source 220 of the resource.

At box 125, the electronic authorization may be sent from RAG 205 to a transfer gateway 230, which may collect the given quantity from second source 225 based on the electronic authorization. In some examples, transfer gateway 230 may be similar in structure or implementation to RAG 205. In some examples, RAG 205 may send the electronic authorization to transfer gateway 230 via network 215. It is also contemplated that in some examples, RAG 205 may send the electronic authorization to transfer gateway 230 directly or via a network other than network 215.

As discussed above, the electronic authorization may direct, instruct, or authorize transfer gateway 230 to access second source 225 using the second credential and to collect from second source 225 the given quantity of the resource set out in the electronic request. In addition, while FIG. 2 shows transfer gateway 230 communicating directly with second source 225, it is contemplated that in some examples transfer gateway 230 may be in communication with second source 225 indirectly, via network 215, or via another network. In addition, in some examples, collecting the given quantity of the resource from second source 225 may comprise accessing or reading the given quantity, copying the given quantity, transferring the given quantity out of second source 225, and the like.

In some examples, the electronic authorization may instruct transfer gateway 230 to transfer the given amount of the resource to a repository associated with RAG 205. In some examples, this repository may comprise a CRSM, a virtual currency account, an electronic or digital account for storing digital representations of traditional currency, and the like. In general, the nature of the repository may be selected based on the nature of the resource, to allow the repository to store the given quantity of the resource. In some examples, RAG 205 may then cause the given quantity to be transferred out of its repository and into a repository associated with the source of the electronic request. The source of the electronic request may also be described as the requester. Moreover, in some examples, the electronic authorization may instruct transfer gateway 230 to transfer the given amount of the resource into the repository associated with the requester It is also contemplated that in some examples, RAG 205 may perform the functions of transfer gateway 230. It such examples, system, 200 need not comprise transfer gateway 230 and RAG 205 may collect the quantities of the resource from second source 225.

At box 130, a confirmation of access to the given quantity of the resource may be output. In some examples, the confirmation of access may comprise digital data, a digital data structure, a digital data packet, an electrical analogue or digital signal, an in-wire or wireless signal, and the like. Moreover, in some examples, the confirmation of access may be generated based on a confirmation from transfer gateway 230 that the given quantity was successfully collected from second source 225. Furthermore, in some examples the confirmation of access may be generated by RAG 205.

In addition, in some examples outputting the confirmation of access may comprise storing the confirmation of access in a memory, sending the confirmation of access to an output terminal, communicating the confirmation of access to another component or to another system, or the like. Moreover, in some examples outputting the confirmation of access may comprise printing the confirmation of access, or sending the confirmation of access to input interface 240. Furthermore, in some examples outputting the confirmation of access may comprise sending the confirmation of access to the requester.

In some examples, method 100 may further comprise, after receiving the first credential at RAG 205, receiving the second credential at RAG 205. The second credential may then be stored in the credential storing CRSM in association with the first credential. In some examples, this receiving and storing the second credential may be described as an initializing step in which the second credential is received and stored in association with the first credential.

Moreover, in some examples, RAG 205 may receive the second credential which is input via input interface 210. Furthermore, in some examples, the second credential ma be input at input interface 210 in response to the electronic request. It is also contemplated that in some examples each of the first and second credentials ma also include information identifying the associated first and second sources. For example, when the resource is data and the first and second sources are data centers or repositories, the first and second credentials may comprise it identifying the data centers as well as passwords or other information used to gain access to the data stored in those data centers.

Similarly, in examples where the resource is currency and the sources are currency repositories or accounts, the associated credentials may comprise a repository or account identifier as well as the passwords, personal identification numbers (PINs), or other information used to gain access to the currency in those repositories or accounts.

Upon receiving the first and second credentials during the initializing step, RAG 205 may cause the credentials to be stored in the credential storing CRSM in association with one another. Subsequent to the initializing step, the access attempts may then effectively use the first credential (associated with the first source) to access the resource from the second source. In this manner, both the first and second sources are accessible using one of the credentials, i.e. the first credential. This, in turn, may obviate the need for transmitting the second credential during every attempt to access the resource from the second source.

Obviating the need to transmit the second credential for the subsequent (to the initializing step) access attempts reduces the amount of information that is transmitted for each access attempt. This, in turn, renders the communication schemes made possible by the methods and systems described herein more efficient in terms of the network bandwidth and power used for the communication. This increased efficiency addresses at least some of the technical challenges associated with the power and bandwidth costs and limitations in communication networks.

In addition, the communication schemes made possible by the methods and systems described herein provide increased security since the second credential need not be transmitted during the subsequent access attempts. This, in turn, makes the second credential less vulnerable to interception while being transmitted via communication networks, and makes the communication schemes made possible by the methods and systems described herein more secure. This increased security addresses at least some of the technical challenges associated with interception and unauthorized access of electronic messages or credentials communicated over communication networks.

In this description, subsequent access attempts refer to access attempts subsequent to the initial access attempt during which the initializing step may be completed. It is also contemplated that in some examples, the initializing step may be completed prior to or separately from the initial access attempt.

It is contemplated that in some examples, the credential storing CRSM may be a component of RAG 205. It is also contemplated that in some examples the credential storing CRSM may be outside of or separate from RAG 205. In this description credential storing CRSM may also be referred to as "CRSM" in short.

In some examples, method 100 may further comprise, before sending the electronic authorization, generating at RAG 205 a backup electronic authorization for the given quantity to be accessed from first source 220 using the first credential. The backup electronic authorization may be similar to the electronic authorization. Moreover, generating the backup electronic authorization may be similar to generating the electronic authorization. Once the given quantity of the resource is successfully collected from second source 225, the backup electronic authorization may be released.

In some examples, RAG 205 may release the backup electronic authorization. Moreover, in some examples, releasing the backup electronic authorization may comprise reversing, deleting, deactivating, or otherwise negating the backup electronic authorization. Furthermore, in some examples, the backup electronic authorization may be sent to a further transfer gateway 235. In some examples, transfer gateway 235 may be similar in function to transfer gateway 230.

In some examples, the backup electronic authorization may direct or instruct transfer gateway 235 to secure the availability of the given quantity of the resource from first source 220 while the backup electronic authorization remains in effect. Furthermore, in some examples, securing the availability of the given quantity from the first source may comprise ensuring that the given quantity remains available to access, read, or copy. Moreover, in some examples, securing the availability of the given quantity from the first source may comprise preventing the given quantity from being collected from or transferred out of first source 220 while the backup electronic authorization remains in effect, so that the given quantity remains available should the need arise to later collect or transfer the given quantity from first source 220.

In the example of data stored in a data center, the backup electronic authorization may cause transfer gateway 235 to prevent the given quantity from being erased, moved, or otherwise rendered inaccessible from first source 220. In the example of currency stored in a repository or account, the backup electronic authorization may prevent the given quantity from being transferred out of the account or otherwise rendered inaccessible while the backup electronic authorization remains in effect.

Furthermore, in some examples, to release the backup electronic authorization, RAG 205 may generate and send to transfer gateway a release authorization, which may cause transfer gateway 235 to release or deactivate the backup electronic authorization in relation to the given quantity of the resource in first source 220. Placing a backup electronic authorization against the given quantity in first source 220 may allow first source 220 to act as a backup for second source 225. In the even the given quantity of the resource cannot be successfully collected from second source 225, the backup electronic authorization may ensure that the given quantity remains available to be collected from first source 220.

In addition, in some examples, method 100 may further comprise the ability to collect the given quantity from first source 220 if transfer gateway 230 fads to collect the given quantity from second source 225 based on the electronic authorization. In such a case, RAG 205 may generate a further electronic authorization for the given quantity to be collected from first source 220 using the first credential.

RAG 205 may send the further electronic authorization to transfer gateway 235. Transfer gateway 235, in turn, may collect the given quantity from first source 220 based on the further electronic authorization.

As discussed above, the methods and systems described herein may allow first source 220 to be used as a backup for second source 225. This, in turn, may provide redundancy and increase the reliability of methods and systems described herein M providing successful access to the given quantity of the resource in case one of the sources of the resource becomes faulty, corrupted, insufficient, or otherwise inaccessible. This in turn at least partially addresses the technical challenges associated with the unreliability of access associated with failures or corruptions of the sources.

While the above description describes first source 220 as being used as a backup for second source 225, it is also contemplated that in some examples second source 225 may be used as a backup for first source 220. In addition, it is contemplated that in some examples more than two sources of the resource may be used, in which case any one or More of the sources may be used as back for any one or more of the other sources.

It is also contemplated that in some examples, if the entirety of the given quantity is not available from one of the sources, the RAG may authorize the available amount to be collected from the source, and also authorize the remainder of the given quantity to be collected from one or more backup sources. Moreover, while FIG. 2 shows RAG 205 communicating with transfer gateway 235 via network 215, it is contemplated that in some examples, RAG 205 may communicate with gateway 235 directly of via a network other than network 215.

Moreover, in some examples, method 100 may further comprise obtaining at the RAG a second source status indicator to indicate whether the second source contains the given quantity of the resource. In some examples, the second source status indicator may comprise digital data, a digital data structure, a digital data packet, an electrical analogue or digital signal, an in-wire or wireless signal, and the like. Moreover, in some examples, the second source status indicator may be obtained before the electronic authorization is generated. In some such examples where the second source status indicator is obtained, the RAG may then generate the electronic authorization based on this status indicator.

In some examples, the RAG may obtain the status indicator by retrieving it from a database or other data storage that tracks the status of the second source. Moreover, in some examples, this data storage may comprise a CRSM. Furthermore, in some examples, the RAG may generate and send a request for the status indicator to the transfer gateway or another gateway or entity that may be able to provide the status indictor for the second source.

In addition, in some examples, the RAG may generate the electronic authorization for the given quantity of the resource to be collected from the second source based on the second source status indicator. For example, if the status indicator indicates that the second source does not contain the full given quantity of the resource, then the RAG may tailor the electronic authorization to collect only the available portion of the resource from the second source. Moreover, in some examples, if the status indicator indicates that the second source does not contain the full given quantity of the resource, then the RAG may tailor the electronic authorization to collect all, a portion, or the remainder of the given quantity from a source other than the second source.

Furthermore, in some examples, if the second source status indicator indicates that the second source does not contain the given quantity of the resource, the RAG may refrain from generating the electronic authorization for the given quantity to be collected from the second source. Moreover, instead of or in addition to refraining from generating the electronic authorization, in some examples where the second source status indicator indicates that the second source does not contain the given quantity of the resource, the RAG may refrain from sending the electronic authorization (if one is generated) to the transfer gateway. In other words, in some examples where the second source status indicator indicates that the second source does not contain the given quantity of the resource, the actions associated with one or more of boxes 120, 125, and 130 of method 100 may not be performed. This, in turn, may reduce the power, computational resources, and network bandwidths that would be used and potentially wasted if the actions associated with boxes 120 and 125 were to be performed when the second source status indicator indicates that the second source does not contain the given quantity of the resource.

In addition, while FIG. 2 shows transfer gateway 235 communicating directly with first source 220, it is contemplated that in some examples transfer gateway 235 may communicate with first source 220 indirectly, via network 215, or via another network. Furthermore, it is contemplated that in some examples, transfer gateway 235 or its functionality may be a component or functionality of RAG 205. Moreover, while FIG. 2 shows first and second sources 220 and 225 as having corresponding gateways 235 and 230 respectively, it is contemplated that in some examples, one transfer gateway may communicate with and collect the resource from both of first and second sources 220 and 225.

Furthermore, in FIG. 2 first source 220 and its corresponding transfer gateway 235 are shown in dashed hues to signify that in some examples system 200 need not use or comprise first source 220 and transfer gateway 235. In such examples, backup electronic authorizations and further electronic authorization are not used, and the given quantity may be collected from second source 225.

As discussed above, in some examples the resource ma comprise data, and first and second sources may comprise data repositories or data centers. The data stored in each data center may have its corresponding credentials for accessing the data center and the data stored therein. In some examples, each data center may have a copy of the data, with the data centers acting as backups for one another.

An electronic request for accessing, a given quantity of the data may be received at the RAG. The given quantity may comprise specific portions or instances of the data. In some examples, these specific portions may be specified by memory or storage addresses, file or folder names, or other suitable identifiers. The credentials for accessing the data may be input at an input interface and received by the RAG. In some examples, the credentials may comprise passwords, PINs decryption keys, and the like. The input interface may comprise an input terminal for inputting the first credential. The RAG then obtains the second credential from a CRSM based on the first credential. The second credential may comprise passwords PIM, decryption keys, and the like for accessing the copy of the data stored in the second data center.

The RAG may then generate an electronic authorization for the given quantity of the data to be collected from the second data center using the corresponding second credential. Collecting the data may comprise accessing, reading, copying, or transferring or removing the given quantity of the data. The RAG may then send the authorization to a transfer gateway. The transfer gateway may be a portion of the system architecture of the data center, which portion may perform the functions relating to granting access to read, copy, or (re)move portions of the data stored in the data center. The transfer gateway may then collect the given quantity of the data from the second data center based on the electronic authorization. As discussed above, collecting the given quantity of the data may comprise reading the given quantity of the data, copying the given quantity of the data, transferring a copy out of the second data center and then deleting the given quantity from the second data center, and the like.

Once the given quantity of the data is successfully collected from the second data center, the RAG may output a confirmation of access to the given quantity of the data. In some examples, if some or all of the given quantity of the data cannot be collected from the second data center, the RAG may generate a thither electronic authorization access to collect a portion or the entirety of the given quantity of the data from the first data center. In this manner, the first and second data centers may act as backups for one another, and provide redundancy and increased reliability in the event the data in one of the two data centers become corrupted or otherwise inaccessible.

This redundancy is achieved while communicating only one credential (i.e. the first credential) for each subsequent access attempt to the given quantity of the data. Communicating one credential instead of two for each subsequent access attempt reduces power and network bandwidth used to communicate credentials to complete each subsequent access attempt. In addition, as the second credential need not be communicated over communication networks for subsequent access attempts, the second credential becomes less vulnerable to interception while being communicated via communication networks. This, in turn, renders the communication schemes enabled by the methods and systems described herein more secure.

Furthermore, as discussed above, in some examples the resource may comprise currency or funds, and the first and second sources may comprise digital or electronic, sources or repositories for the currency. In some examples, currency ma comprise virtual currency, digital currency, digital or electronic representations of traditional or fiat currency, and the like. For example the first source may comprise a credit card and the second source may comprise a bank account such as a checking account, and the like. The first credential may comprise the password, PIN, and the like, associated with the credit card. In some examples, a first source identifier (i.e. credit card number, expiry date, card verification value (CVV) code, and the like) may also be part of the first credential for accessing the currency or funds from the credit card. Similarly, in some examples, the second credential may also comprise the password, PIN, and the like, associated with the bank account. In seine examples, the second credential may also comprise an identifier of the bank account, such as an account number, routing number, and the like.

A merchant may submit a transaction in the form of an electronic request for a given amount of currency. The RAG may receive this electronic request. The purchaser may then input his or her credit card credentials at an input interface in association with the transaction. The input interface may comprise a point of sale (PUS) terminal, a mobile device, a computer terminal, a wearable electronic device, a biometric reader, and the like.

The RAG may then obtain the bank account credentials from a credential storing CRSM based on the credit card credentials. The CRSM may store the bank account credentials in association with the credit card credentials. The RAG may generate an electronic authorization for the given amount of currency to be collected from the bank account using the bank account credentials. In some examples, the RAG may authenticate the first credential prior to generating the electronic authorization. Examples of such authentication may include checking or comparing the first credential received from the input interface against a copy of the credentials stored in the RAG or in the CRSM. If the credential received from the input interface matches the stored credentials, then authentication may be successful. It is also contemplated that in some examples the RAG may send the credentials received via the input interface to an authentication module or system, which module or system may be outside of the RAG.

The RAG may then send the electronic authorization to a transfer gateway. In some examples, this transfer gateway may comprise an automated clearing house (ACH) system or gateway. The ACH transfer gateway may also be referred to as the "ACH gateway" in short. The ACH gateway may then perform an automated clearing house transfer (ACH transfer) to collect from the bank account the given quantity of the currency indicated in the electronic request.

In some examples, before generating the electronic authorization or before sending such an authorization to the transfer gateway, the RAG may obtain or check the account status to confirm that the account contains the given quantity or amount of currency. In some examples, the RAG may send a request to the ACH gateway or another gateway or entity to obtain the status of the account. Moreover, in some examples, the RAG may retrieve the account status from a repository that stores or tracks the status of the account. If there are insufficient funds in the account, the RAG may refrain from generating the electronic authorization or refrain from sending such an authorization to the transfer gateway. This, in turn, may help to reduce or eliminate transfer or transaction declines due to insufficient funds. Such declines may have economic or reputational costs for the merchants who initiated the transaction. As such, reducing or avoiding transaction declines may reduce costs for the merchants and help the merchants maintain their reputations or working relationships with their financial institutions. In addition, in some examples, the account status may be stored or output as a stand-alone service to third-party merchants who may also be seeking to reduce or avoid transaction declines.

In addition, in some examples, the status indicator of the account may be determined or based on factors in addition to the account balance on a given date. In some examples, determining the account status indictor may also include performing risk assessment or underwriting to determine the likelihood of a transaction decline. Status indicators determined in such a manner may be described as augmented or "smart" status indictors. In some such examples, the electronic authorization to transfer funds out of the account may then be based on such a smart status indictor. Such authorizations that are based on a smart status indictor may be described as smart authorizations.

In some examples, the risk assessment or underwriting may include assessing the debit and credit history of the account over a given time window to determine the likelihood that a further transaction or transfer out of the account would be declined. For example, if the debit and credit history of an account indicate that there is a high likelihood of large monthly withdrawals from the account in the next few days, such withdrawals may be judged to increase the likelihood of a decline (due to insufficient funds) in relation to a further withdrawal transaction that would be authorized to take place subsequent to those predicted large withdrawals. In this manner, a smart status indictor may be used to make predictions about the likelihood of transaction declines associated with an ACH transfer. ACH authorizations or transfers that are initiated with the predictive benefit of a smart status indictor may also be described as "smart" ACH authorizations or "smart" ACH transfers. In addition, it is contemplated that in some examples, instead of or in addition to the ACH gateway, a different bank account debiting gateway may be used.

In some examples, once the given quantity has been successfully collected from the bank account, the ACH gateway may send a confirmation of collection to the RAG. The RAG may then output a confirmation of access to the given quantity of the currency. In some examples, the RAG may send this confirmation of access to one or more of the input interface, the merchant who initiated the electronic request, and the like.

As the ACH transaction fees may be lower than credit card processing fees, funding or processing the transaction using the bank account may be more cost-effective than using a credit card. In addition, credit cards often offer fraud protection and other safeguards to credit card users that are more extensive than the safeguards offered by banks to bank account holders. The methods and systems described herein allow credit card information to be used and transmitted over communication networks in order to access funds from a bank account. In this manner, bank account credentials need not be transmitted to fund a transaction from the bank account. This in turn reduces the likelihood of the bank account credentials being intercepted and compromised while being communicated via a communication network, which increases security.

Moreover, if the credit card credentials become intercepted or compromised while being communicated over communication networks, the credit card holder may be able to rely on the credit card holder safeguards that are more extensive than the safeguards that are typically provided by banks in relation to bank account credentials.

Furthermore, communicating the credit card credentials and not the bank account credentials reduces the amount of data that is transmitted over communication networks in order to access funds for each transaction. This, in turn, reduces the power and network bandwidth used for remotely accessing the funds, and increases the communication efficiency.

In addition, most purchasers may have their credit card information readily available, while they may not have their bank account information (such as account number and routing number) ready at hand. The ability to use credit card information to access a bank account may save the purchasers the challenge and effort of obtaining or finding their bank account information, which information they may not have ready at hand. This, in turn, may facilitate the use of bank accounts for paying for electronic or mobile commerce transactions.

Furthermore, in some examples, the ACH transfer may be indicated as generic or non-descript transactions on the purchaser's bank account statement. Credit card statements, in contrast, may explicitly list the name or information of the merchant. Allowing a purchaser to use his or her bank account while providing credit card credentials may allow for anonymizing the manner in which the transaction is listed on the purchaser's account statement.

In some examples, the ACH gateway may transfer the given quantity of the funds to an account associated with the RAG. In some examples, the RAG may deduct a processing fee from these funds. The RAG may then transfer the funds to an account associated with the merchant. Furthermore, in sonic examples the ACH gateway may transfer the funds directly to an account associated with the merchant.

Moreover, in some examples, the credit card may be used as a backup for the bank account, in case sufficient funds are not available from the bank account to settle the transaction. In some examples, before sending the electronic authorization to the ACH gateway, the RAG may generate a backup electronic authorization for the given quantity of the funds to be accessed from the credit card, in some examples, this backup electronic authorization may comprise a credit card authorization or hold.

Furthermore, in some examples the credit card authorization may be sent to a credit card processing gateway, in some examples, the credit card processing gateway may include a credit card provider, a credit card processor, and the like. The credit card processing gateway may also be referred to as a credit card gateway. The credit card gateway may then authorize the hold for the given quantity of the funds against the credit card, to ensure that the given quantity of the funds remains available for withdrawal from the credit card. In some examples, once the funds are successfully collected from the bank account and the RAG generates the confirmation of success, this backup electronic authorization on the credit card may be released. In some examples, the RAG may generate a release authorization, which is then sent to the credit card gateway to instruct the credit card gateway to release the backup electronic authorization or hold.

This backup credit card authorization may allow the transaction to be funded and completed relatively quickly, even in cases where the ACH transfer process may be somewhat slower. In the event there are insufficient funds in the bank account by the time the ACH transfer is processed, the credit card authorization may be used to cover the shortfall.

In addition, in some examples, if the ACH gateway fails to collect the given quantity of the funds from the bank account, the RAG may then generate a further electronic authorization for the given quantity to be collected from the credit card using the credit card credentials. The RAG may then send this further electronic authorization to the credit card gateway to collect the given quantity of the funds from the credit card. In this manner the credit card may act as the backup for the bank account, which in turn provides added redundancy and reliability to the ability to access the funds to pay for the transaction in case the bank account has insufficient funds or the bank account funds become otherwise inaccessible.

In some examples, the first time a purchaser uses the RAG, the purchaser may be guided through an initializing process to allow the RAG to receive the purchaser's bank account information and credentials, which will then be stored in the CRSM in association with the purchaser's credit card information and credentials. In some examples, the initializing step may comprise the use of data aggregation services (DAS). Once the RAG recognizes based on the credit card credentials that the purchaser is a first-time user of the RAG, the RAG may transfer the customer to a DAS system or interface.

DAS may maintain a record of the bank accounts of a purchaser associated with an identifier of the purchaser, such as the purchaser's credit card information or credentials. Once the DAS is provided with the credit card credentials that is input by the purchaser at the input interface, the DAS may provide the purchaser with a list of the purchaser's bank accounts or financial institutions. The purchaser may then those from the list a financial institution or a bank account, and then input the bank account credentials for authenticating or accessing the bank account. In some examples, the DAS may check or authenticate the bank account credentials. The bank account credentials may then be sent by the DAS to the RAG to be stored in the CRSM in association with the credit card credentials. This may constitute linking the purchaser's credit card with the purchaser's bank account. Subsequent to this initializing step, the RAG may allow the purchaser to access funds from his or her bank account using his or her credit card credentials.

It is also contemplated that in some examples, debit or other payment cards and their associated credentials ma be used as the first source and the first credential, instead of the credit card and the credit card credentials.

Figure 3:
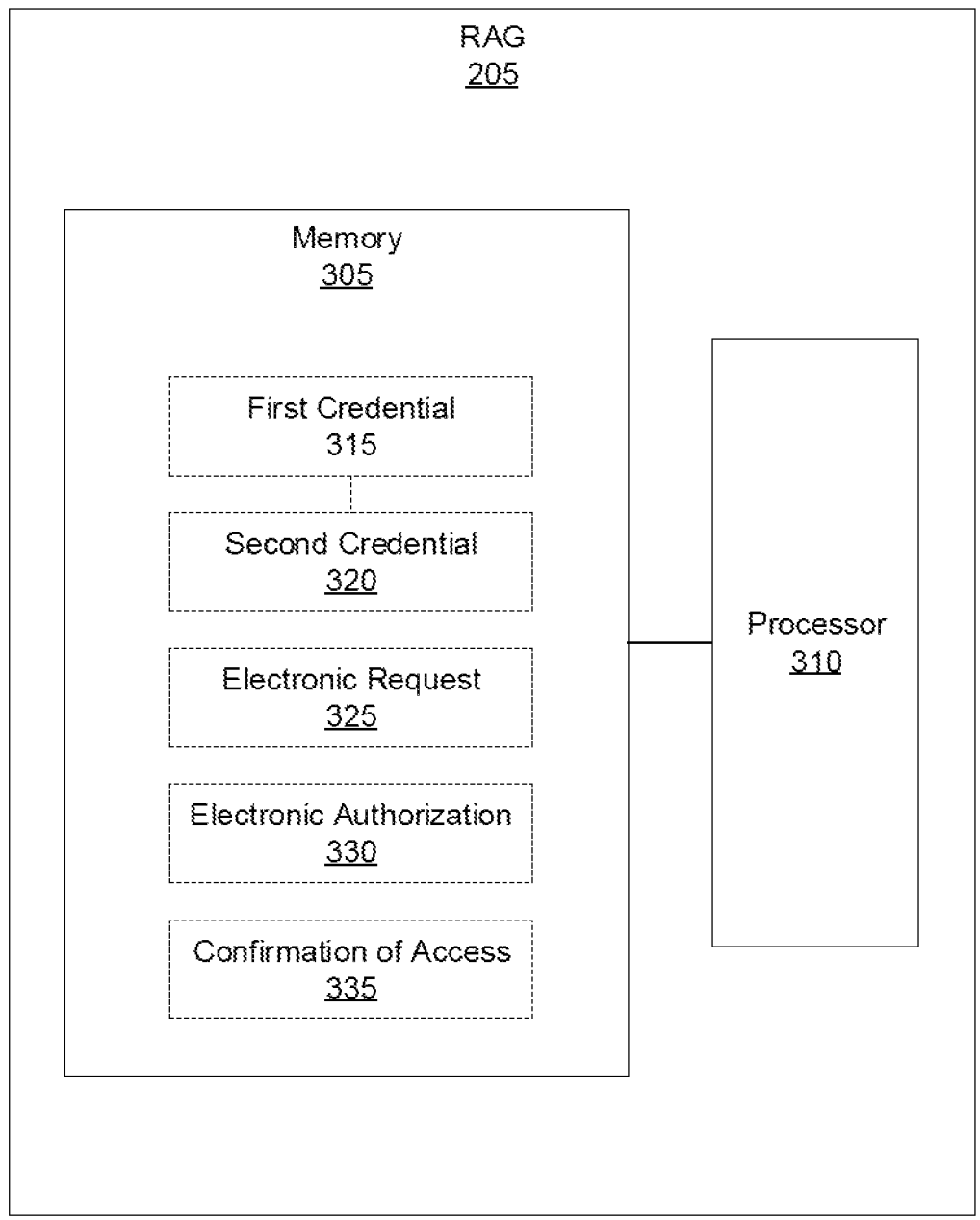
FIG. 3 shows a block diagram of an example resource access gateway, in accordance with a non-limiting implementation of the present specification.

Turning now to FIG. 3, a schematic representation is shown of an example resource access gateway (RAG) 205, which may comprise a memory 305 in communication with a processor 310. In some examples, RAG 205 may be used for securely accessing a resource. Moreover, in some examples, RAG 205 may have the features or functionality described in relation to method 100 and the other methods described herein. Furthermore, in some examples, RAG 205 may be used to perform method 100 and the other methods described herein.

In some examples, memory 305 may include a non-transitory machine-readable storage medium that may be any electronic, magnetic, optical, or other physical storage device that stores executable instructions. The machine-readable storage medium may include, for example, random access memory (RAM), read-only memory (ROM), electrically-erasable programmable read-only memory (EEPROM) flash memo, a storage drive, an optical disc, cloud-based storage, virtualized storage, and the like. The machine-readable storage medium may be encoded with executable instructions. Memory 305 may store a first, credential 315 for accessing a first source of the resource in association with a second credential 320 for accessing a second source of the resource.

Processor 310, in turn, may include a central processing unit (CPU), a graphics processing unit (GPU), a microcontroller, a microprocessor, a processing core, a field-programmable gate array (FPGA), a virtualized processor, or similar device or module capable of executing instructions. Processor 310 may be in communication with and cooperate with the memory 305 to execute instructions. Processor 310 may receive an electronic request 325 for a giver quantity of the resource.

Processor 310 may also receive first credential 315 input at an input interface in association with the electronic request. In addition, processor 310 may obtain second credential 320 from memory 305 based on first credential 315. It is contemplated that in some examples, one or more of first credential 315 and second credential 320 may be stored in a credential storing CRSM that my be different than memory 305. This credential storing CRSM may be part of or outside of RAG 205.

In addition, processor 310 may generate an electronic authorization 330 for the given quantity to be collected from the second source using the second credential, and may send electronic authorization 330 to a transfer gateway. The transfer gateway may, in turn, collect the given quantity from the second source based on electronic authorization 330. Furthermore, processor 310 may output a confirmation of access 335 to the given quantity of the resource. In some examples, to output confirmation of access 335, confirmation of access 335 may be stored in memory 305 or a different memory, sent to an output terminal, communicated to another component of RAG 205 or to another system, or the like.

In FIG. 3 first credential 315, second credential 320, electronic request 325, electronic authorization 330, and confirmation of access 335 are shown in dashed lines to indicate that in some examples, one or more of these entities may be stored outside of memory 305 in RAG 205 or outside of RAG 205.

In some examples, processor 310 may, before sending electronic authorization 330, generate a backup electronic authorization for the given quantity to be accessed from the first source using first credential 315. Processor 310 may also release the backup electronic authorization after outputting confirmation of access 335.

Moreover, in some examples, if the transfer gateway fails to collect the given quantity from the second source based on electronic authorization 330, processor 310 may generate a further electronic authorization for the given quantity to be collected from the first source using first credential 315. Processor 310 may also send the further electronic authorization to a further transfer gateway. The further transfer gateway, in turn, may collect the given quantity from the first source based on the further electronic authorization.

Furthermore, processor 310 may receive second credential 320 after receiving first credential 315, and may then store in memory 305 second credential 320 in association with first credential 315. It is also contemplated that in some examples processor 310 may store first and second credentials 315 and 320 in association with one another in a credential storing CRSM which may be different than memory 305.

In addition, in some examples, processor 310 may send electronic authorization 330 to the transfer gateway to direct the transfer gateway to collect the given quantity from the second source and transfer the given quantity into a repository associated with the RAG. Moreover, in some examples, processor 310 may receive electronic request 325 from a requester for the given quantity of the resource. Processor 310 may then send electronic authorization 330 to the transfer gateway to direct the transfer gateway to collect the given quantity from the second source and transfer the given quantity into a repository associated with the requester.

Moreover, in some examples, processor 310 may further obtain a second source status indicator to indicate whether the second source contains the given quantity of the resource. In some examples, processor 310 may obtain the second source status indicator before generating electronic authorization 330. In some such examples, processor 310 may generate electronic authorization 330 based on the second source status indicator.

Figure 4:
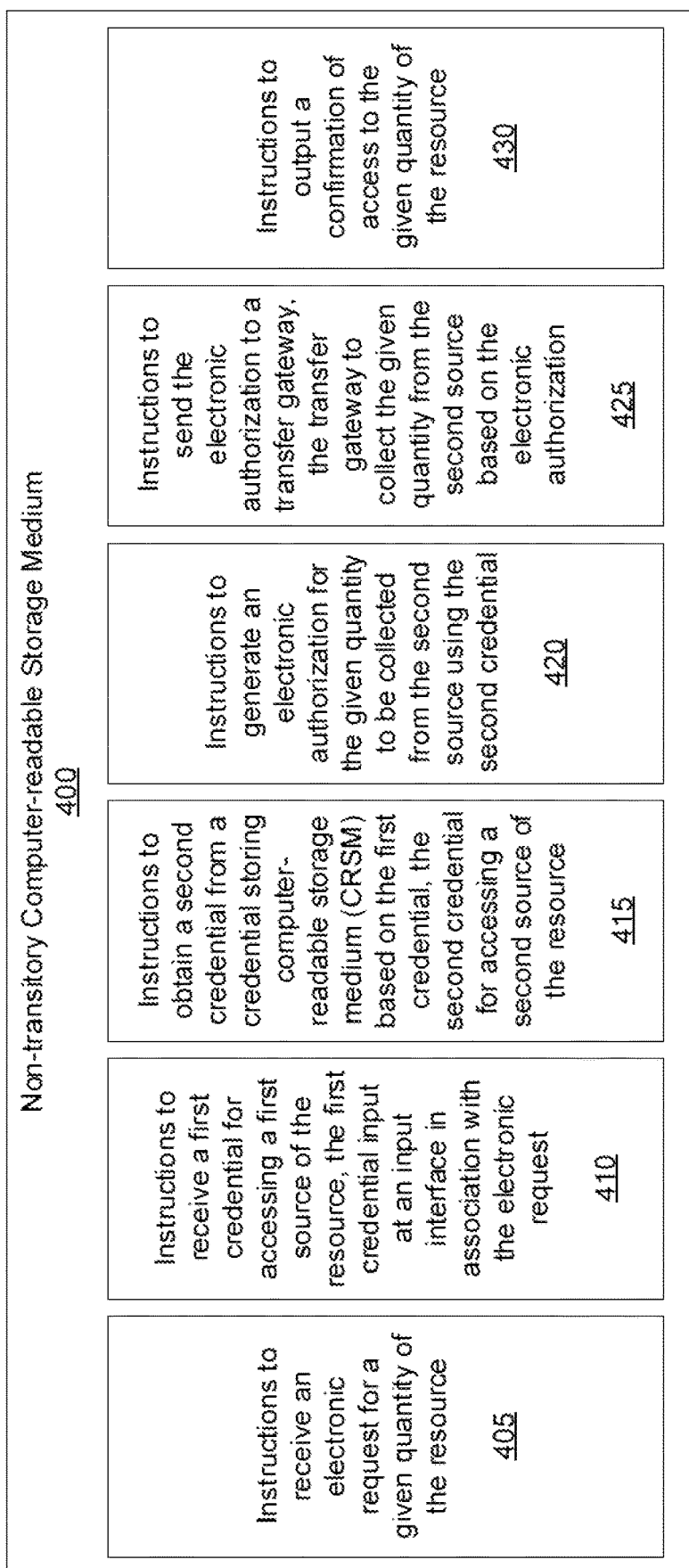
FIG. 4 shows a block diagram of an example computer-readable storage medium, in accordance with a non-limiting implementation of the present specification.

Turning now to FIG. 4, an example non-transitory computer-readable storage medium (CRSM) 400 is shown, which CRSM 400 comprises instructions executable by, a processor. The CRSM may comprise any electronic, magnetic, optical, or other physical storage device that stores executable instructions. The functions and features of the CRSM 400 may be similar to the functions and features described in relation to the methods, systems, and RAGs described herein.

The instructions may comprise instructions 405 to receive an electronic request for a given quantity of the resource. The instructions may also comprise instructions 410 to receive a first credential for accessing a first source of the resource. The first credential may be input at an input interface in association with the electronic request. In addition, the instructions may comprise instructions 415 to obtain a second credential from a credential storing computer-readable storage medium (CRSM) based on the first credential. The second credential may be for accessing a second source of the resource.

Moreover, the instructions may comprise instructions 420 to generate an electronic authorization for the given quantity to be collected from the second source using the second credential, and instructions 425 to send the electronic authorization to a transfer gateway. The transfer gateway. Furthermore, the instructions may comprise instructions 430 to output a confirmation of access to the given quantity of the resource.

In some examples, the instructions may further cause the processor to generate a backup electronic authorization for the given quantity to be accessed from the first source using the first credential, before sending the electronic authorization. The instructions may also cause the processor to release the backup electronic authorization after outputting the confirmation of access.

Furthermore, in some examples, if the transfer gateway fails to collect the given quantity from the second source based on the electronic authorization, the instructions may further cause the processor to generate a further electronic authorization for the given quantity to be collected from the first source using the first credential. The instructions may also cause the processor to send the further electronic authorization to a further transfer gateway. The further transfer gateway, in turn, may collect the given quantity from the first source based on the further electronic authorization.

Moreover, in some examples, the instructions, may further cause the processor to receive the second credential after receiving the first credential, and store in the credential storing CRSM the second credential in association with the first credential. In addition, in some examples, the instructions may cause the processor to send the electronic authorization to the transfer gateway to direct the transfer gateway to collect the given quantity from the second source and transfer the given quantity into a repository associated with a resource access gateway (RAG), the processor associated with the RAG.

In addition, in some examples, the instructions may further cause the processor to receive the electronic request from a requester for the given quantity of the resource, and to send the electronic authorization to the transfer gateway to direct the transfer gateway to collect the given quantity from the second source and transfer the given quantity into a repository associated with the requester.

Furthermore, in some examples, the instructions may further cause the processor to obtain a second source status indicator to indicate whether the second source contains the given quantity of the resource. In sonic examples, such instructions may cause the processor to obtain the second source status indicator before generating, the electronic authorization. Moreover, in some examples, such instructions may cause the processor to generate the electronic authorization based on the second resource status indicator.

The methods described herein may be performed using the systems described herein. In this context, "system" includes the systems and devices described herein, including the RAGS described herein, and the like. In addition, it is contemplated that the methods described herein may be performed using systems different than the systems described herein. Moreover, the systems described herein may perform the methods described herein and may perform or execute the instructions stored in the CRSMs described herein. It is also contemplated that the systems described herein may per functions or execute instructions other than those described in relation to the methods and CRSMs described herein.

Furthermore, the CRSMs described herein may store instructions corresponding to the methods described herein, and may store instructions which may be performed or executed by the systems described herein. Furthermore, it is contemplated that the CRSMs described herein may store instructions different than those corresponding to the methods described herein, and may store instructions which may be performed by systems other than the systems described herein.

The methods, systems, and CRSMs described herein may include the features or perform the functions described herein in association with any one or more of the other methods, systems, and CRSMs described herein.

Throughout this specification and the appended claims, infinitive verb forms are often used. Examples include, without limitation: "to collect," "to direct," "to store," "to generate," and the like. Unless the specific context requires otherwise, such infinitive verb forms are used in an open, inclusive sense, that is as "to, at least, collect," to, at least, direct," "to, at least, store," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for securely accessing a resource, the method comprising:
   receiving at a resource access gateway (RAG) an electronic request for a given quantity of the resource, the resource comprising currency, the resource being one or more of storable in and obtainable from a first source of the resource, the first source comprising a credit card, and the resource being one or more of storable in and obtainable from a second source of the resource, the second source comprising a bank account;
   receiving at the RAG a first credential for accessing the first source of the resource, the first credential associated with the first source, wherein the first credential is input at an input interface in association with the electronic request;
   obtaining at the RAG a second credential from a credential storing computer-readable storage medium (CRSM) based on the first credential, the second credential associated with the second source, the second credential for accessing the second source of the resource;
   generating at the RAG an electronic authorization for the given quantity to be collected from the second source using the second credential;
   sending the electronic authorization from the RAG to a transfer gateway, the transfer gateway to collect the given quantity from the second source based on the electronic authorization; and
   outputting a confirmation of access to the given quantity of the resource.

2. The method of claim 1, further comprising:
   before the sending the electronic authorization, generating at the RAG a backup electronic authorization for the given quantity to be accessed from the first source using the first credential; and
   after the outputting the confirmation of access, releasing the backup electronic authorization.

3. The method of claim 1, further comprising:
   if the transfer gateway fails to collect the given quantity from the second source based on the electronic authorization:
      generating at the RAG a further electronic authorization for the given quantity to be collected from the first source using the first credential; and
      sending the further electronic authorization from the RAG to a further transfer gateway, the further transfer gateway to collect the given quantity from the first source based on the further electronic authorization.

4. The method of claim 1, further comprising:
   after the receiving at the RAG the first credential, receiving at the RAG the second credential; and
   storing in the credential storing CRSM the second credential in association with the first credential.

5. The method of claim 1, wherein the sending the electronic authorization from the RAG to the transfer gateway comprises sending the electronic authorization from the RAG to the transfer gateway to direct the transfer gateway to collect the given quantity from the second source and transfer the given quantity into a repository associated with the RAG.

6. The method of claim 1, wherein:
   the receiving at the RAG the electronic request for the given quantity of the resource comprises receiving at the RAG the electronic request from a requester for the given quantity of the resource; and
   the sending the electronic authorization from the RAG to the transfer gateway comprises sending the electronic authorization from the RAG to the transfer gateway to direct the transfer gateway to collect the given quantity from the second source and transfer the given quantity into a repository associated with the requester.

7. The method of claim 1, further comprising:
   before the generating the electronic authorization, obtaining at the RAG a second source status indicator to indicate whether the second source contains the given quantity of the resource; and
   wherein:
   the generating the electronic authorization comprises generating at the RAG the electronic authorization based on the second source status indicator.

8. A resource access gateway (RAG) for securely accessing a resource, the RAG comprising:

a memory to store a first credential for accessing a first source of the resource in association with a second credential for accessing a second source of the resource;

a processor in communication with the memory, the processor to:

receive an electronic request for a given quantity of the resource, the resource comprising currency, the resource being one or more of storable in and obtainable from the first source of the resource, the first source comprising a credit card, and the resource being one or more of storable in and obtainable from the second source of the resource, the second source comprising a bank account;

receive the first credential as an input at an input interface in association with the electronic request, the first credential associated with the first source;

obtain the second credential from the memory based on the first credential, the second credential associated with the second source;

generate an electronic authorization for the given quantity to be collected from the second source using the second credential;

send the electronic authorization to a transfer gateway, the transfer gateway to collect the given quantity from the second source based on the electronic authorization; and output a confirmation of access to the given quantity of the resource.

9. The RAG of claim 8, wherein the processor is further to:

before sending the electronic authorization, generate a backup electronic authorization for the given quantity to be accessed from the first source using the first credential; and after outputting the confirmation of access, release the backup electronic authorization.

10. The RAG of claim 8, wherein the processor is further to:

if the transfer gateway fails to collect the given quantity from the second source based on the electronic authorization:

generate a further electronic authorization for the given quantity to be collected from the first source using the first credential; and send the further electronic authorization to a further transfer gateway, the further transfer gateway to collect the given quantity from the first source based on the further electronic authorization.

11. The RAG of claim 8, wherein the processor is further to:

after receiving the first credential, receive the second credential; and store in the memory the second credential in association with the first credential.

12. The RAG of claim 8, wherein to send the electronic authorization to the transfer gateway the processor is to send the electronic authorization to the transfer gateway to direct the transfer gateway to collect the given quantity from the second source and transfer the given quantity into a repository associated with the RAG.

13. The RAG of claim 8, wherein:

to receive the electronic request for the given quantity of the resource the processor is to receive the electronic request from a requester for the given quantity of the resource; and to send the electronic authorization to the transfer gateway the processor is to send the electronic authorization to the transfer gateway to direct the transfer gateway to collect the given quantity from the second source and transfer the given quantity into a repository associated with the requester.

14. The RAG of claim 8, wherein the processor is further to:

before generating the electronic authorization, obtain a second source status indicator to indicate whether the second source contains the given quantity of the resource; and wherein:

to generate the electronic authorization, the processor is to generate the electronic authorization based on the second source status indicator.

15. A non-transitory computer-readable storage medium comprising instructions for securely accessing a resource executable by a processor, the instructions to cause the processor to:

receive an electronic request for a given quantity of the resource, the resource comprising currency, the resource being one or more of storable in and obtainable from a first source of the resource, the first source comprising a credit card, and the resource being one or more of storable in and obtainable from a second source of the resource, the second source comprising a bank account;

receive a first credential for accessing the first source of the resource, the first credential associated with the first source, wherein the first credential is input at an input interface in association with the electronic request;

obtain a second credential from a credential storing computer-readable storage medium (CRSM) based on the first credential, the second credential associated with the second source, the second credential for accessing the second source of the resource;

generate an electronic authorization for the given quantity to be collected from the second source using the second credential;

send the electronic authorization to a transfer gateway, the transfer gateway to collect the given quantity from the second source based on the electronic authorization; and output a confirmation of access to the given quantity of the resource.

16. The non-transitory computer-readable storage medium of claim 15, wherein the instructions are to further cause the processor to:

before sending the electronic authorization, generate a backup electronic authorization for the given quantity to be accessed from the first source using the first credential; and after outputting the confirmation of access, release the backup electronic authorization.

17. The non-transitory computer-readable storage medium of claim 15, wherein the instructions are to further cause processor to:

if the transfer gateway fails to collect the given quantity from the second source based on the electronic authorization:

generate a further electronic authorization for the given quantity to be collected from the first source using the first credential; and send the further electronic authorization to a further transfer gateway, the further transfer gateway to collect the given quantity from the first source based on the further electronic authorization.

18. The non-transitory computer-readable storage medium of claim 15, wherein the instructions are to further cause processor to:
   after receiving the first credential, receive the second credential; and
   store in the credential storing CRSM the second credential in association with the first credential.

19. The non-transitory computer-readable storage medium of claim 15, wherein to cause the processor to send the electronic authorization to the transfer gateway the instructions are to cause the processor to send the electronic authorization to the transfer gateway to direct the transfer gateway to collect the given quantity from the second source and transfer the given quantity into a repository associated with a resource access gateway (RAG), the processor associated with the RAG.

20. The non-transitory computer-readable storage medium of claim 15, wherein:
   to cause the processor to receive the electronic request for the given quantity of the resource the instructions are to cause the processor to receive the electronic request from a requester for the given quantity of the resource; and
   to cause the processor to send the electronic authorization to the transfer gateway the instructions are to cause the processor to send the electronic authorization to the transfer gateway to direct the transfer gateway to collect the given quantity from the second source and transfer the given quantity into a repository associated with the requester.

21. The non-transitory computer-readable storage medium of claim 15, wherein the instructions are to further cause processor to:
   before generating the electronic authorization, obtain a second source status indicator to indicate whether the second source contains the given quantity of the resource; and
   wherein:
      to cause the processor to generate the electronic authorization the instructions are to cause the processor to generate the electronic authorization based on the second source status indicator.

* * * * *